US009323590B2

(12) United States Patent
Terashita et al.

(10) Patent No.: US 9,323,590 B2
(45) Date of Patent: Apr. 26, 2016

(54) MESSAGE CONTROL PROGRAM FOR MANAGING ELECTRIC POWER SYSTEM BY MESSAGE QUEUING BETWEEN APPLICATIONS BASED ON PRIORITY

(71) Applicants: KABUSHIKI KAISHA TOSHIBA, Minato-ku, Tokyo (JP); TOSHIBA SOLUTIONS CORPORATION, Minato-ku, Tokyo (JP)

(72) Inventors: Yosuke Terashita, Chiba (JP); Kaori Morishita, Saitama (JP); Chika Nakazato, Tokyo (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 13 days.

(21) Appl. No.: 14/526,614

(22) Filed: Oct. 29, 2014

(65) Prior Publication Data

US 2015/0058674 A1    Feb. 26, 2015

Related U.S. Application Data

(63) Continuation of application No. PCT/JP2012/073089, filed on Sep. 10, 2012.

(51) Int. Cl.
*G06F 3/00* (2006.01)
*G06F 9/54* (2006.01)
(Continued)

(52) U.S. Cl.
CPC .............. *G06F 9/546* (2013.01); *G06F 11/079* (2013.01); *G06F 11/0715* (2013.01); *G06F 13/00* (2013.01); *G06F 13/42* (2013.01)

(58) Field of Classification Search
CPC ................................. G06F 9/546; G06F 13/00

USPC ................................................ 710/52–54, 65
See application file for complete search history.

(56) References Cited

U.S. PATENT DOCUMENTS 6,658,485 B1 * 12/2003 Baber ..................... G06F 9/546
                                                              718/103
2006/0224787 A1 * 10/2006 Hamada ............... G06Q 10/107
                                                              710/52

FOREIGN PATENT DOCUMENTS

JP    2008-153791    7/2008
JP    2011-182115    9/2011
JP    2012-147122    8/2012

OTHER PUBLICATIONS

Technical Specification; Energy management system application program interface (EMS-API)—Part 401: Component interface specification (CIS) framework; International Electrotechnical Commission (2005); pp. 1-13.

(Continued)

*Primary Examiner* — Tammara Peyton
(74) *Attorney, Agent, or Firm* — Finnegan, Henderson, Farabow, Garrett & Dunner, LLP

(57) ABSTRACT

A message control program of an embodiment causes a monitoring apparatus to further function as a plurality of message control unit configured to individually controlling a communication method of a message transmitted from each internal application unit. Each message control unit receives a message containing a message type and service name from the internal application unit. Each message control unit specifies communication method identification information from a file based on the message type and service name in the received message. Each message control unit changes the communication method of the received message based on the specified communication method identification information, and sends the message to a common bus.

15 Claims, 19 Drawing Sheets

(51) Int. Cl.
   *G06F 13/00*   (2006.01)
   *G06F 11/07*   (2006.01)
   *G06F 13/42*   (2006.01)

(56) References Cited

OTHER PUBLICATIONS

International Standard; Energy management system application program interface (EMS-API)—Part 402: Common services; International Electrotechnical Commission (2008); pp. 1-8.

International Standard; Energy management system application program interface (EMS-API)—Part 403: Generic data access; International Electrotechnical Commission (2008); pp. 1-8.

International Standard; Energy management system application program interface (EMS-API)—Part 404: High Speed Data Access (HSDA); International Electrotechnical Commission (2007); pp. 1-7.

International Standard; Energy management system application program interface (EMS-API)—Part 405: Generic Eventing and Subscription (GES); International Electrotechnical Commission (2007); pp. 1-8.

International Standard; Energy management system application program interface (EMS-API)—Part 407: Time Series Data Access (TSDA); International Electrotechnical Commission (2007); pp. 1-7.

International Preliminary Report on Patentability and Written Opinion issue by The International Bureau of WIPO on Mar. 19, 2015, for International Application No. PCT/JP2012/073089.

International Search Report from the Japanese Patent Office in International Application No. PCT/JP2012/073089, mailed Nov. 13, 2012, 5 pages.

* cited by examiner

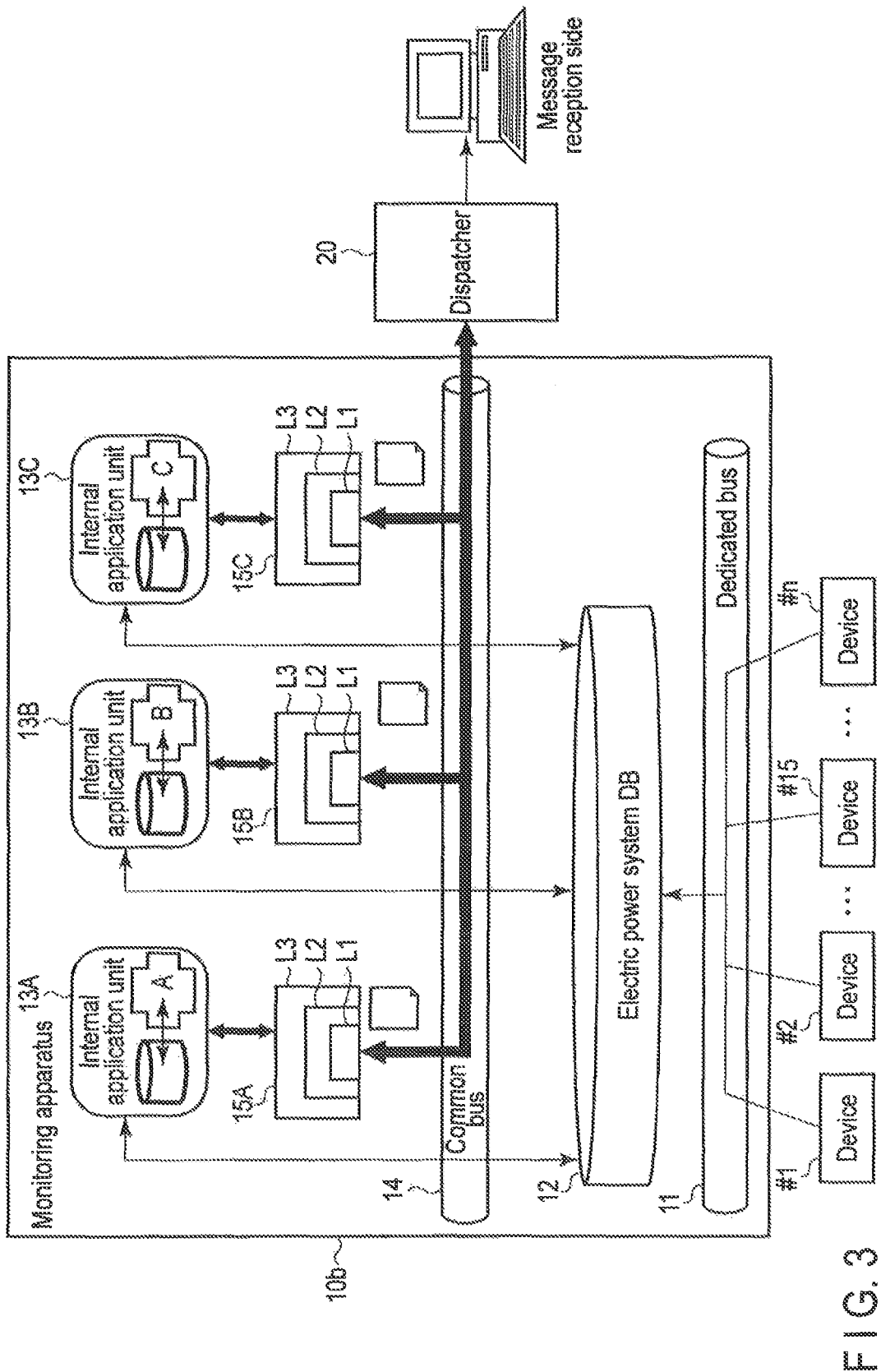
F I G. 3

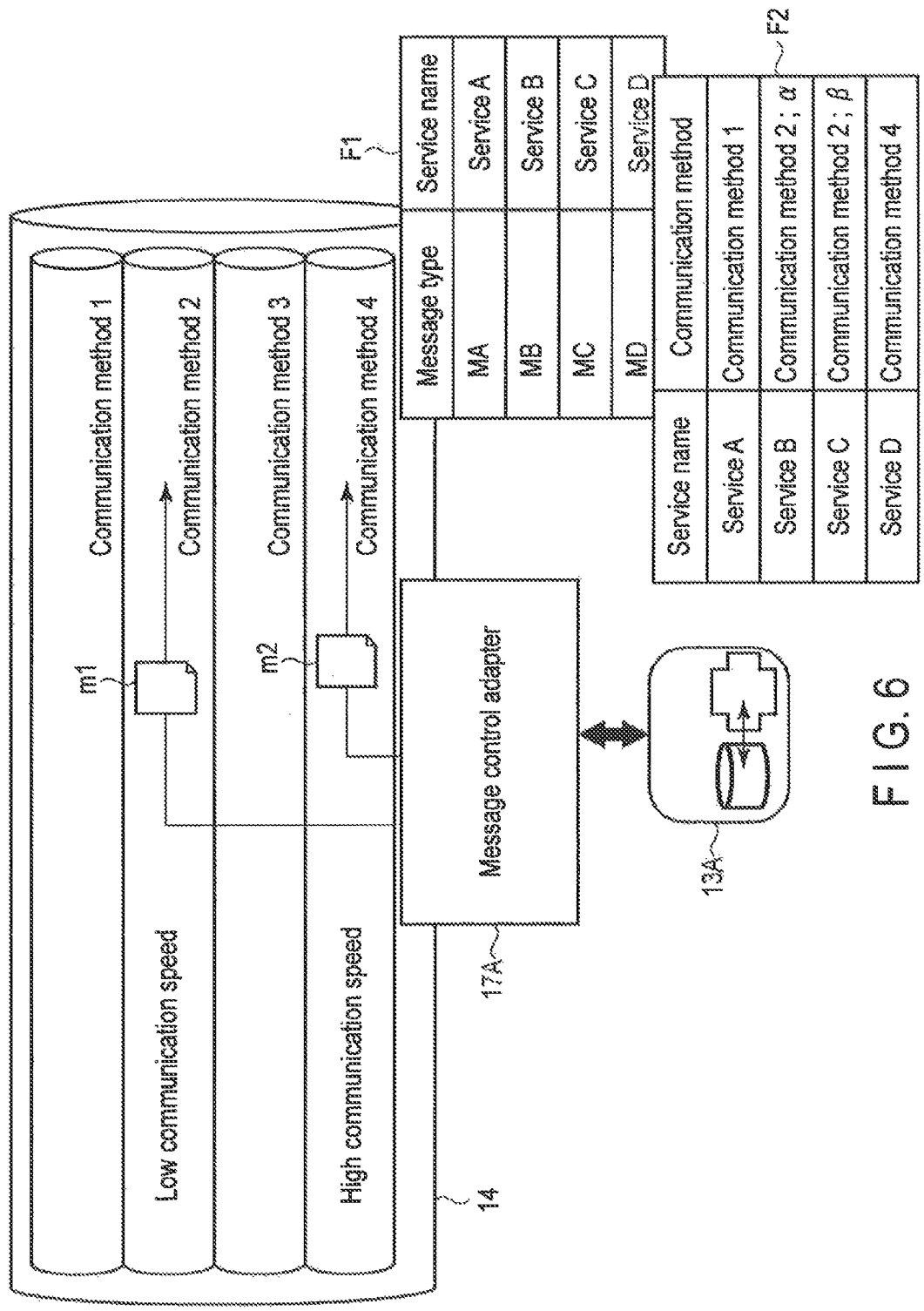
F I G. 6

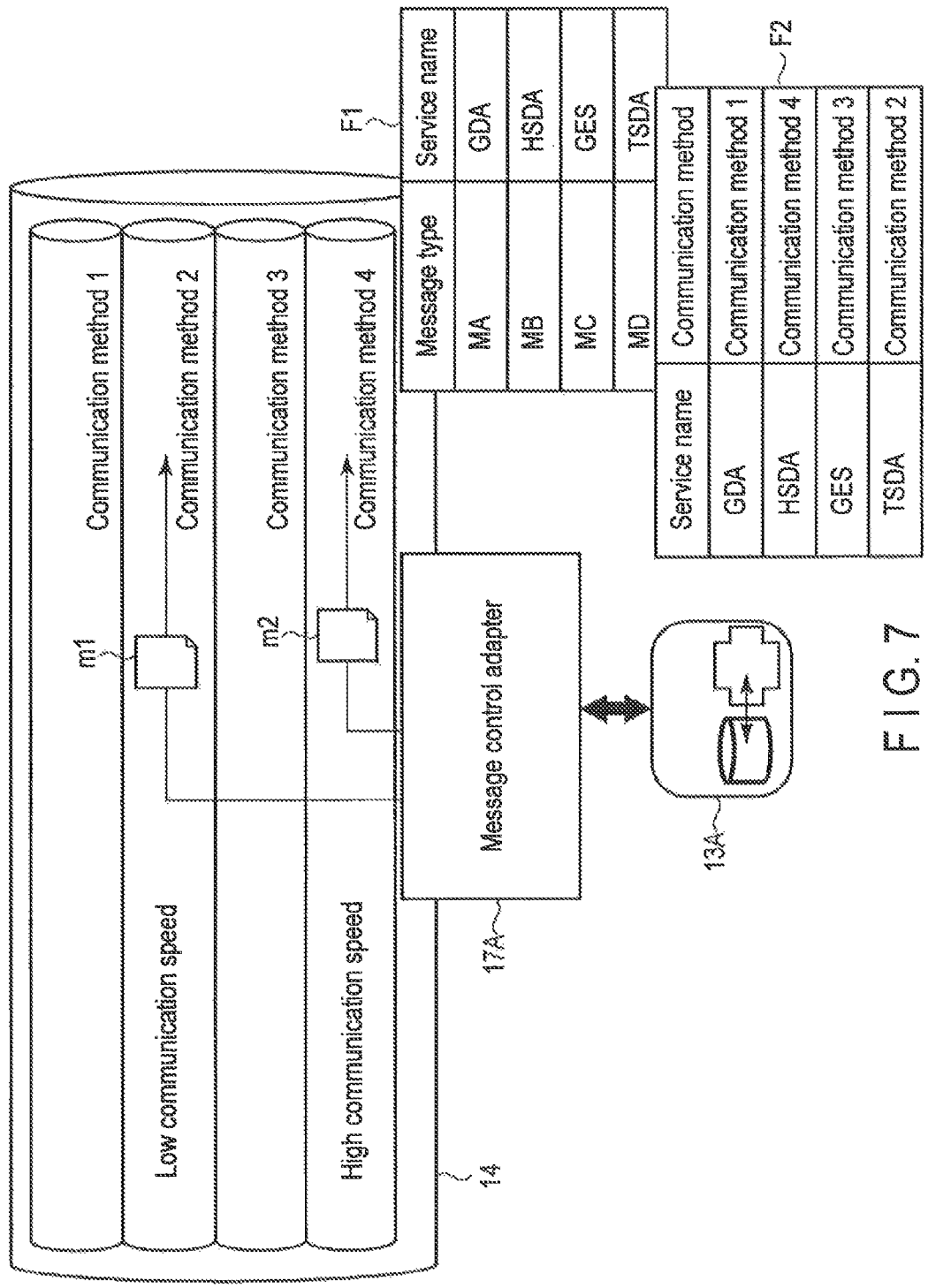
F I G. 7

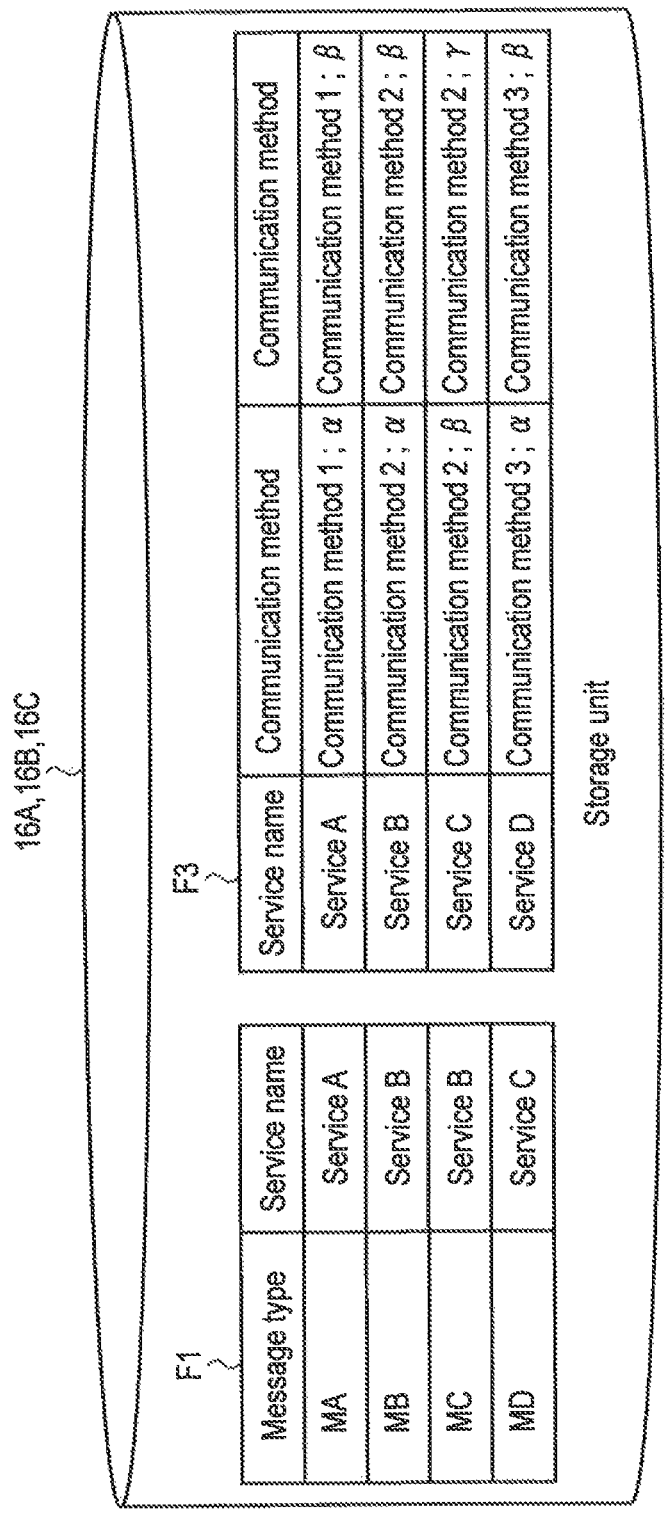
F I G. 8

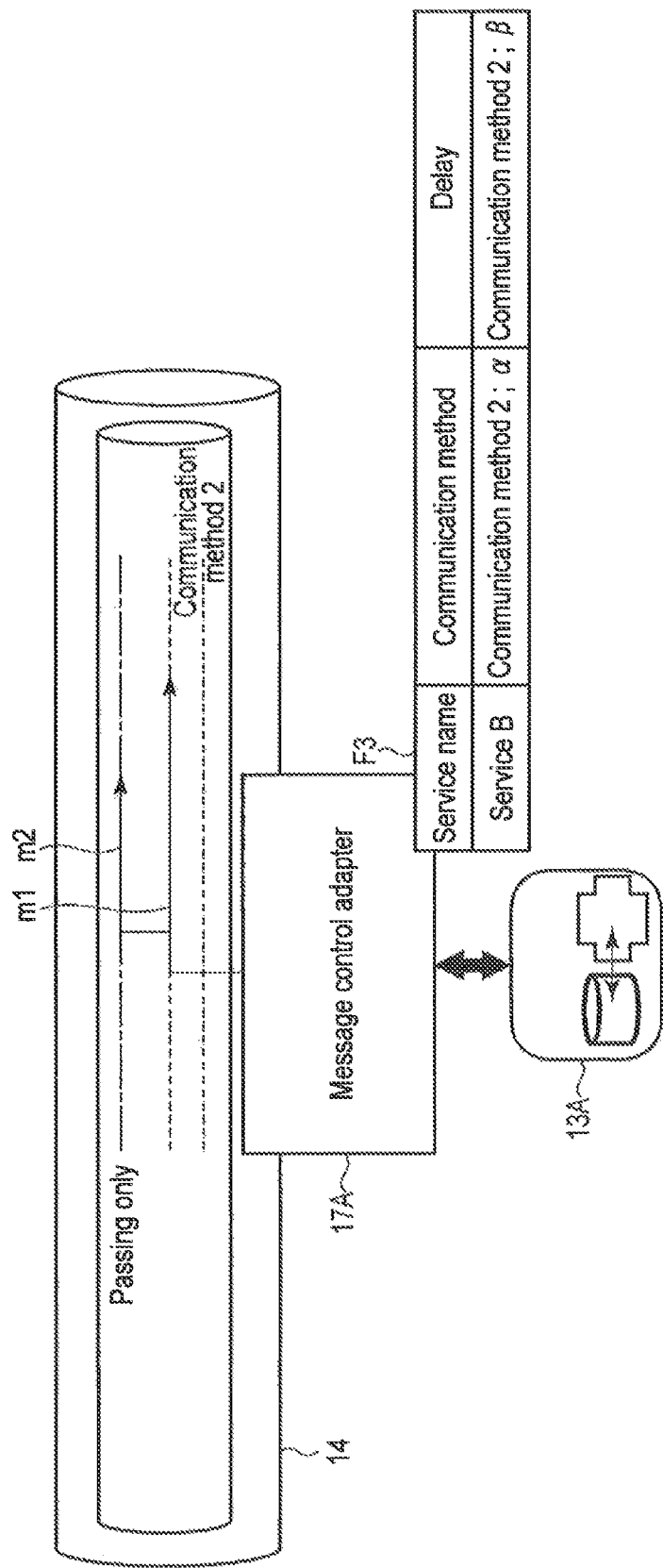
F I G. 9

F I G. 10

| Message type | Service name |
|---|---|
| MA | Service A |
| MB | Service B |
| MC | Service B |
| MD | Service C |

F1

| Service name | Communication method | Communication method |
|---|---|---|
| Service A | Communication method 1 | Communication method 4 |
| Service B | Communication method 2 | Communication method 1 |
| Service C | Communication method 2 | Communication method 1 |
| Service D | Communication method 3 | Communication method 1 |

F4

Storage unit 16A, 16B, 16C

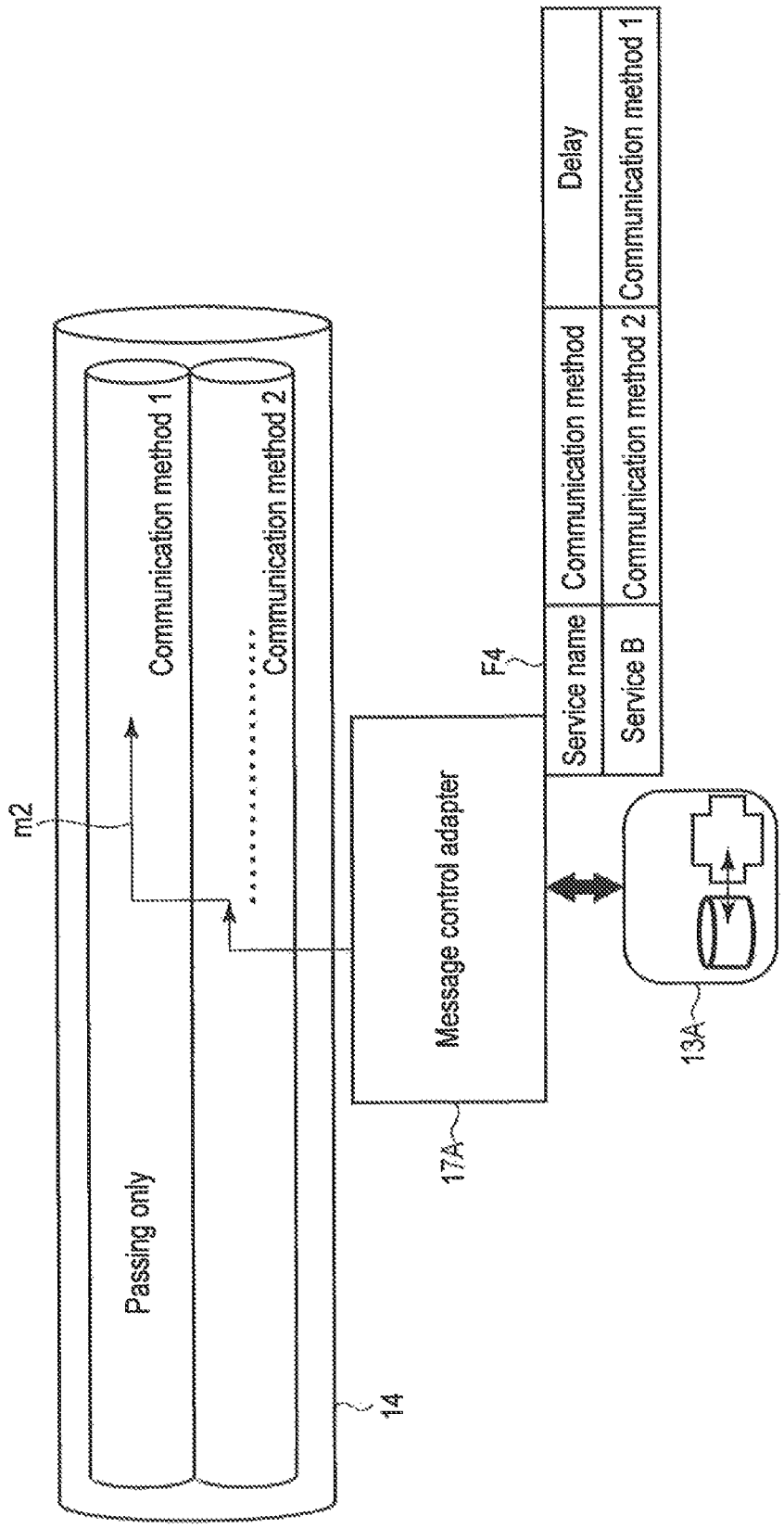
F I G. 11

16A, 16B, 16C

F1

| Message type | Service name |
|---|---|
| MA | Service A |
| MB | Service B |
| MC | Service B |
| MD | Service C |

F5

| Service name | Communication method | Communication method |
|---|---|---|
| Service A | Communication method 3 | Communication method 2 |
| Service B | Communication method 2 ; α | Communication method 2 ; β |
| Service C | Communication method 2 ; β | Communication method 2 ; γ |
| Service D | Communication method 1 | Communication method 2 |

Storage unit

F I G. 12

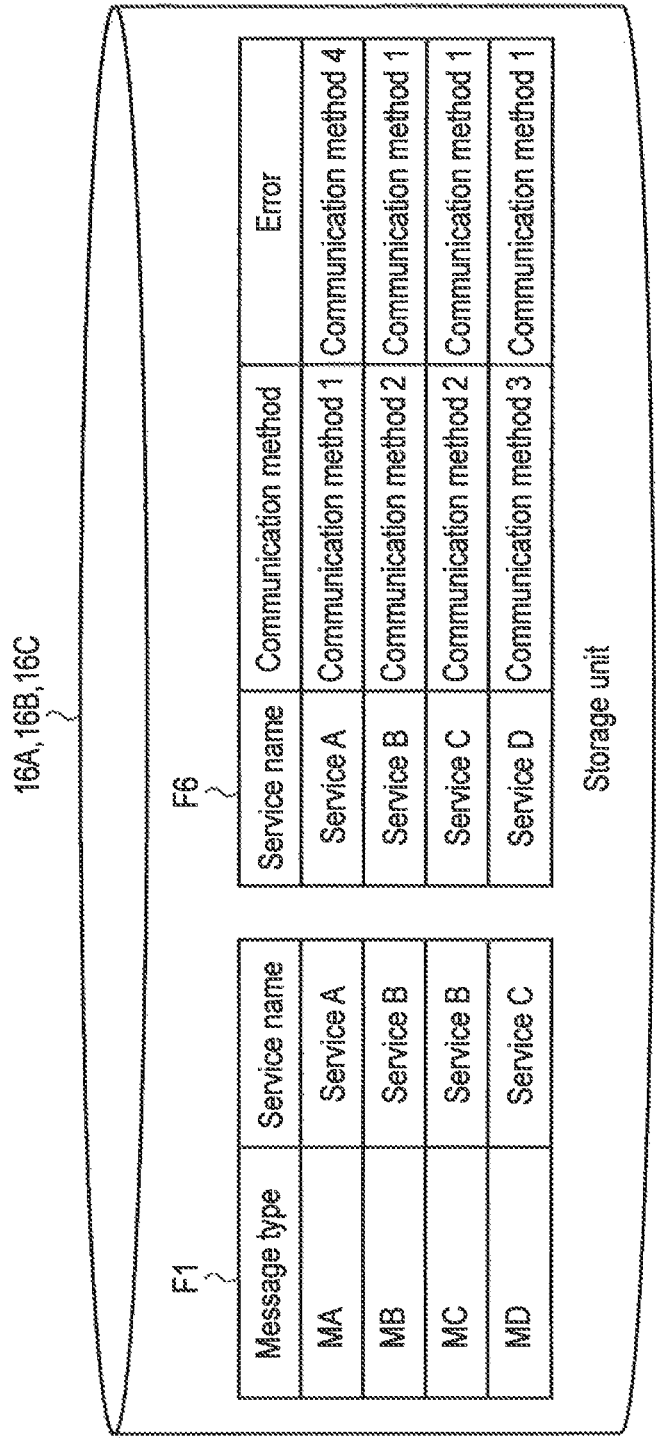
F I G. 14

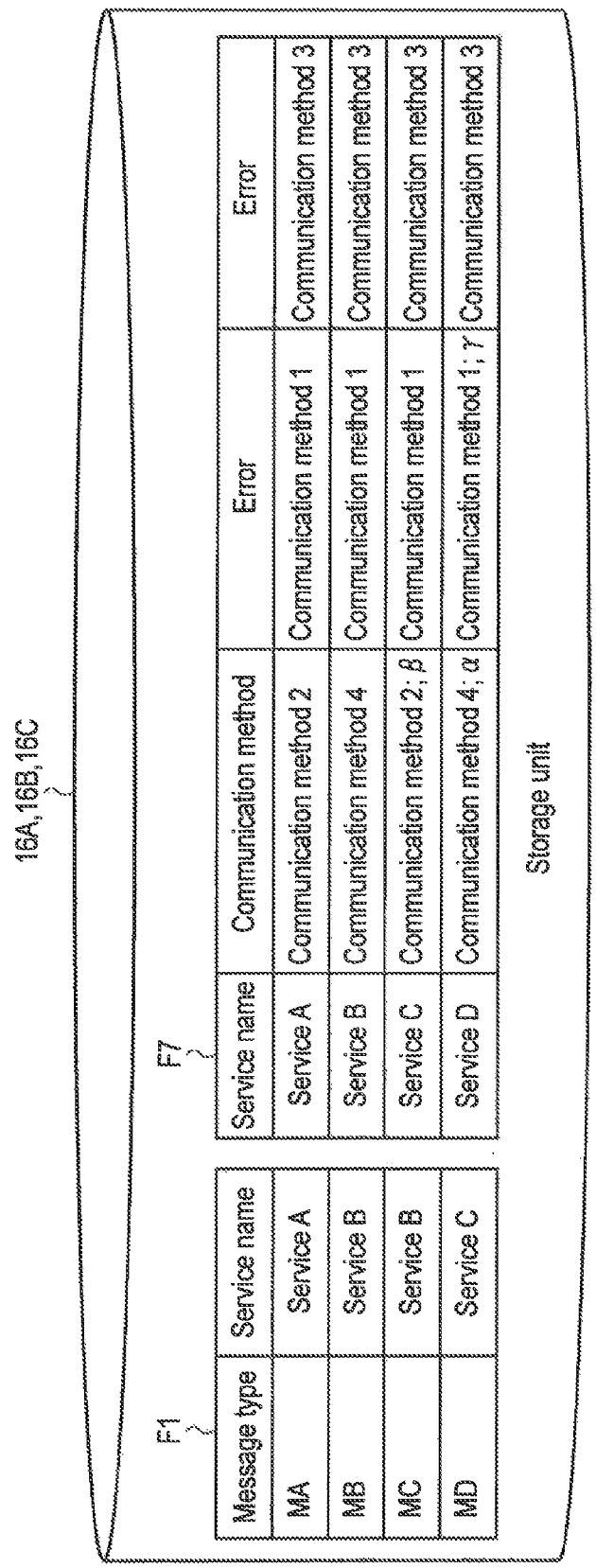
F I G. 16

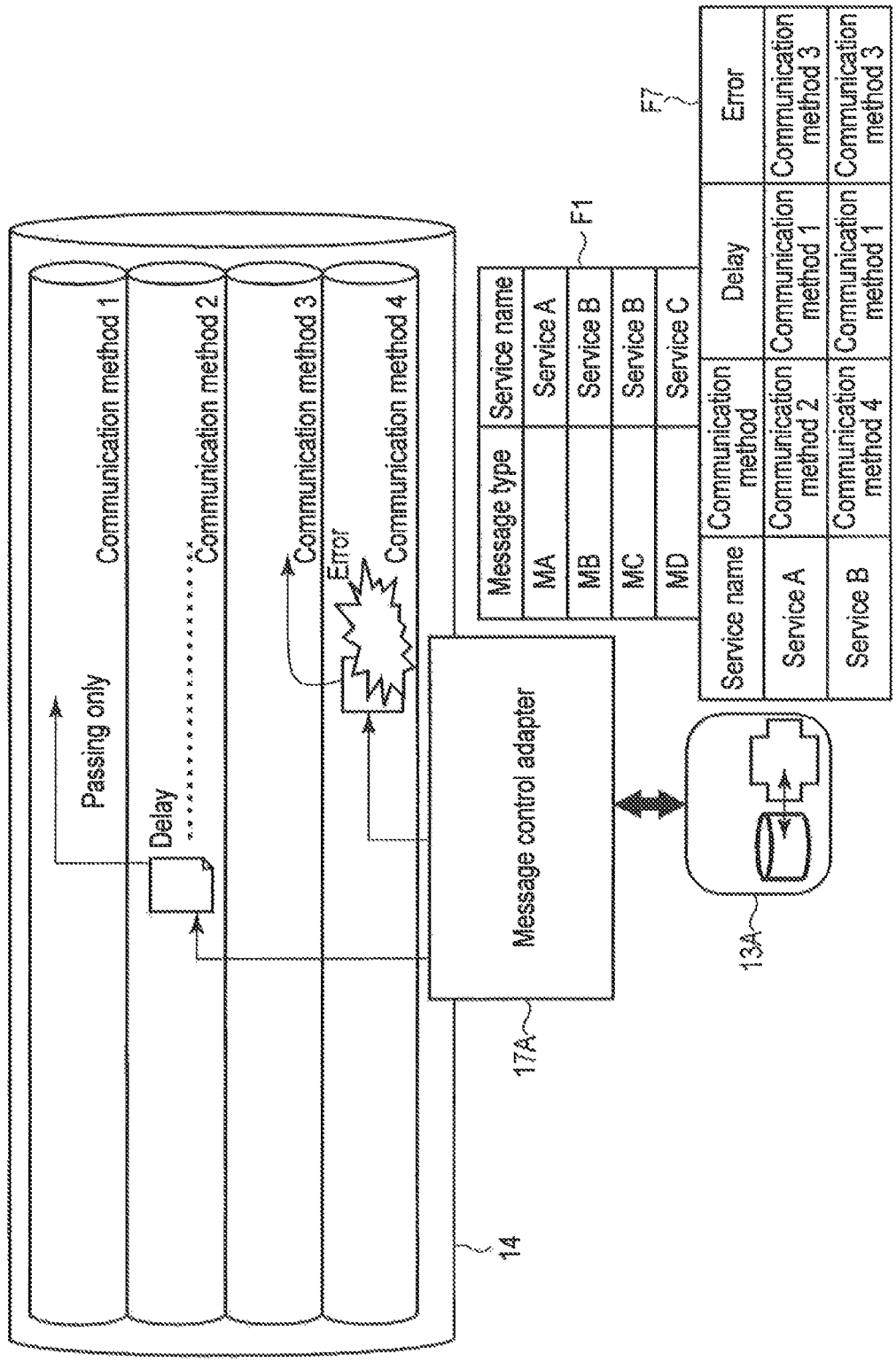
F I G. 17

MESSAGE CONTROL PROGRAM FOR MANAGING ELECTRIC POWER SYSTEM BY MESSAGE QUEUING BETWEEN APPLICATIONS BASED ON PRIORITY

CROSS-REFERENCE TO RELATED APPLICATIONS

This is a Continuation application of PCT application No. PCT/JP2012/073089, filed on Sep. 10, 2012, which was published under PCT Article 21(2) in Japanese.

FIELD

Embodiments described herein relate generally to a message control program.

BACKGROUND

FIG. 1 is a schematic view showing a monitoring apparatus and its peripheral arrangement in a conventional electric power system. In the conventional electric power system, a plurality of devices #1 to #n transmit data to a monitoring apparatus 10, and the monitoring apparatus 10a saves the data in an electric power system DB 12 via a dedicated bus 11.

A processor (not shown) in the monitoring apparatus 10a functions as a plurality of internal application units 13A to 13C by executing a plurality of internal application programs A to C (to be referred to as internal applications A to C hereinafter) in a memory (not shown). The plurality of internal application units 13A to 13C appropriately read out data from the electric power system DB 12, and transmit/receive messages including the data to/from each other.

In this manner, queuing is directly performed mainly between the internal application units 13A to 13C in the conventional electric power system. Thus, messages are transmitted/received according to a method unique to each of the internal application units 13A to 13C. Such a method is called an interconnection method.

Recently, queuing for a plurality of applications and queuing for an external application are becoming indispensable even in an internal application, along with developments in smart communities.

In message queuing between applications, messages are transmitted/received via a common bus 14 in a monitoring apparatus 10b and a plurality of bus connection adapters 15A to 15C, as shown in FIG. 2. Such a method is called a common bus method.

Each of the bus connection adapters 15A to 15C includes a messaging layer L1, connecting layer L2, and adapter layer L3. The messaging layer L1 has a message transmission/reception function. The connecting layer L2 has a function of connecting to the common bus 14. The adapter layer L3 has a message processing function and a queuing function for an existing system.

Also, in message queuing between the applications, the types of processing contents (to be also referred to as services hereinafter) are increasing, and the following CIS (Component Interface Specification) standards are defined.

IEC 61970-401: CIS (Component Interface Specification)—framework
IEC 61970-402: CIS—common service
IEC 61970-403: CIS—GDA (General-purpose Data Access)
IEC 61970-404: CIS—HSDA (High-Speed Data Access)
IEC 61970-405: CIS—GES (General-purpose Event and Subscription)
IEC 61970-407: CIS—TSDA (Time-Series Data Access)

These standards are classified in accordance with services. For example, the HSDA service is high-priority processing, and message processing must be executed with priority over other services.

Examples of a priority control request are as follows.
Pass other messages
Pass other messages by raising priority in accordance with a service.
Processing with particularly high urgency passes other messages even for the same service.
Pass other messages even for the same service if a delay occurs in processing due to, e.g., a network load.
Transmit a message even when an error occurs in a transmission process.

The priority control as described above can be implemented by, e.g., a dispatcher 20 which dispatches a message as shown in FIG. 3. As the dispatcher 20, a JMS (Java Messaging Service) server of Java™ or the like can be used.

In the interconnection method as described above, however, the internal application units 13A to 13C transmit/receive messages by their respective unique methods, and this makes message priority control difficult.

Also, in the common bus method, the dispatcher 20 performs priority control on a message flowing through the common bus 14 and arriving at the dispatcher 20. This makes it difficult to perform priority control on messages flowing through the common bus 14.

A problem to be solved by the present invention is to provide a message control program capable of implementing priority control of messages flowing through a common bus.

BRIEF DESCRIPTION OF THE DRAWINGS

FIG. 3 is a schematic view for explaining conventional priority control.

FIG. 6 is a schematic view for explaining an operation in the first embodiment.

FIG. 7 is a schematic view for explaining an operation in the first embodiment.

FIG. 8 is a schematic view for explaining a storage unit in the second embodiment.

FIG. 9 is a schematic view for explaining an operation in the second embodiment.

FIG. 10 is a schematic view for explaining a storage unit in the third embodiment.

FIG. 11 is a schematic view for explaining an operation in the third embodiment.

FIG. 12 is a schematic view for explaining a storage unit in the fourth embodiment.

FIG. 14 is a schematic view for explaining a storage unit in the fifth embodiment.

FIG. 16 is a schematic view for explaining a storage unit in the sixth embodiment.

FIG. 17 is a schematic view for explaining an operation in the sixth embodiment.

DETAILED DESCRIPTION

In general, according to one embodiment, a message control program of an embodiment is stored in a non-transitory computer-readable storage medium, and is used for a monitoring apparatus including a data storage unit, a plurality of internal application units, and a common bus.

The monitoring apparatus executes the message control program.

The data storage unit stores data received from a plurality of devices.

The plurality of internal application units transmit/receive messages containing the data in the data storage unit.

The common bus can transmit the messages between the plurality of internal application units.

The monitoring apparatus further includes a storage unit.

The storage unit stores a file describing message types indicating the types of the messages, service names for identifying the internal application units, and communication method identification information for identifying communication methods of the messages, by associating these pieces of information with each other.

The message control program is a program for causing the monitoring apparatus to further function as a plurality of message control units for individually controlling a communication method of a message transmitted from each internal application unit.

Each message control unit includes a reception unit, a specifying unit, and a sending unit.

The reception unit receives a message containing the message type and service name from the internal application unit.

The specifying unit specifies communication method identification information from the file based on the message type and service name in the received message.

The sending unit changes the communication method of the received message based on the specified communication method identification information, and sends the message to the common bus.

Embodiments will be explained below with reference to the accompanying drawings.

<First Embodiment>

Figure 1:
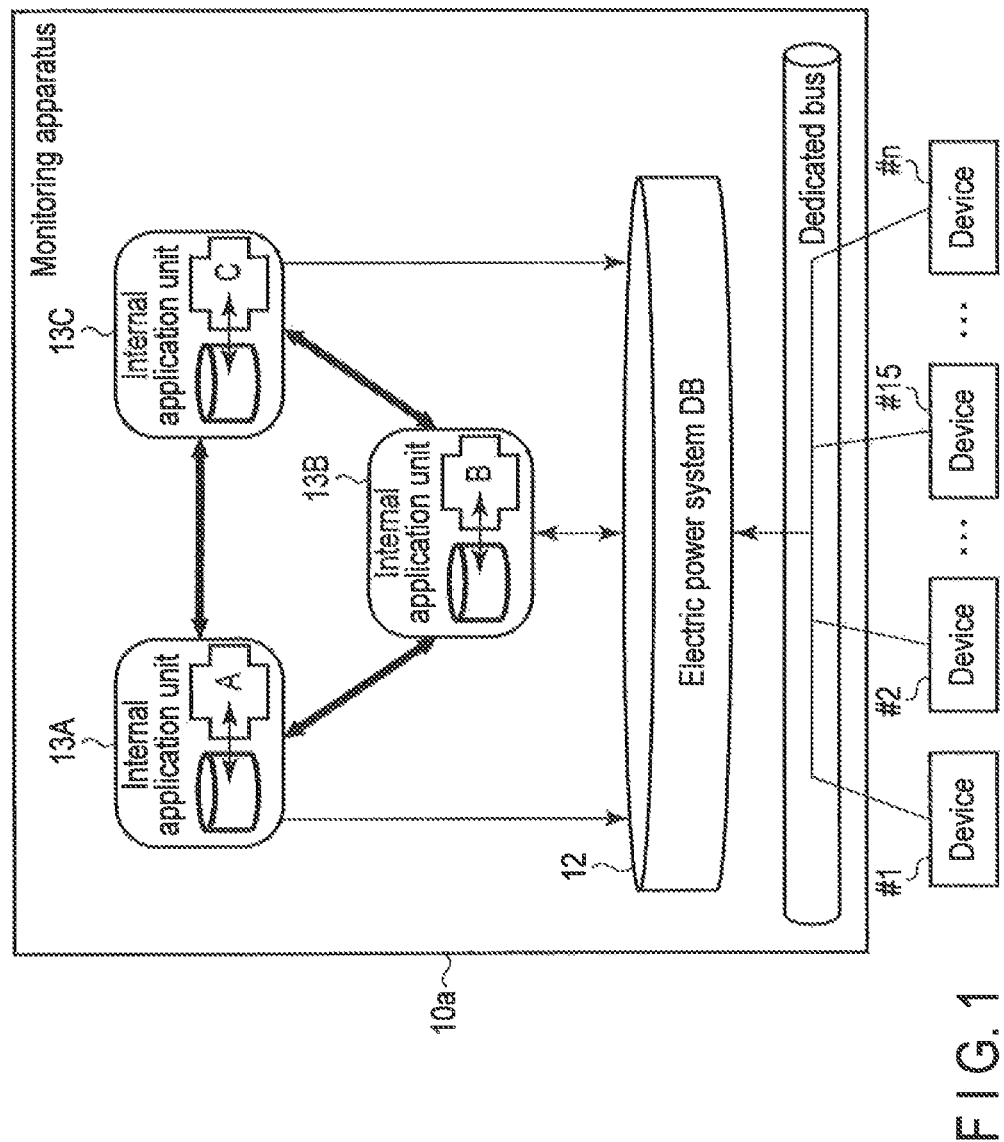
FIG. 1 is a schematic view showing a monitoring apparatus and its peripheral arrangement in a conventional electric power system.
Figure 2:
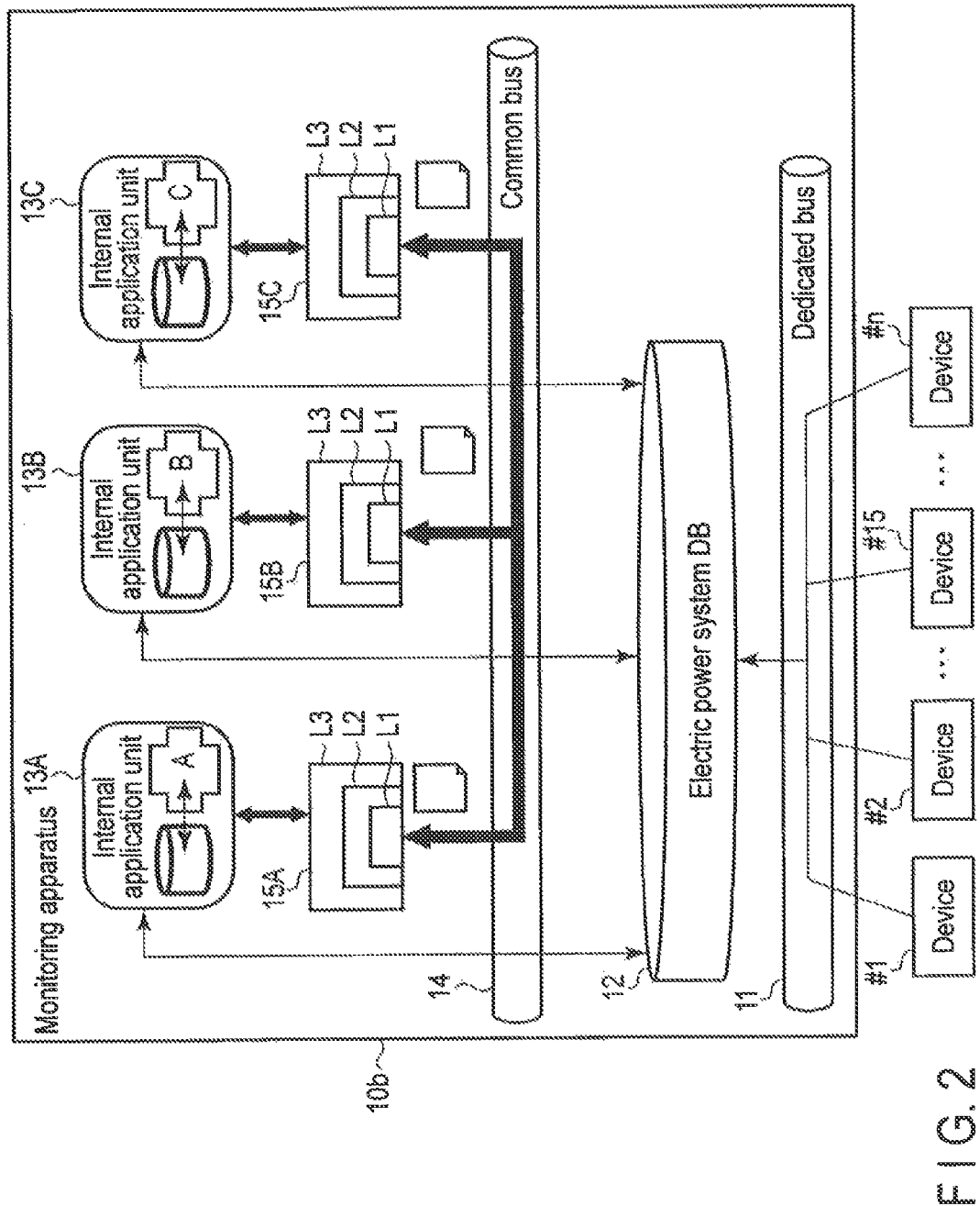
FIG. 2 is a schematic view for explaining a conventional common bus method.
Figure 4:
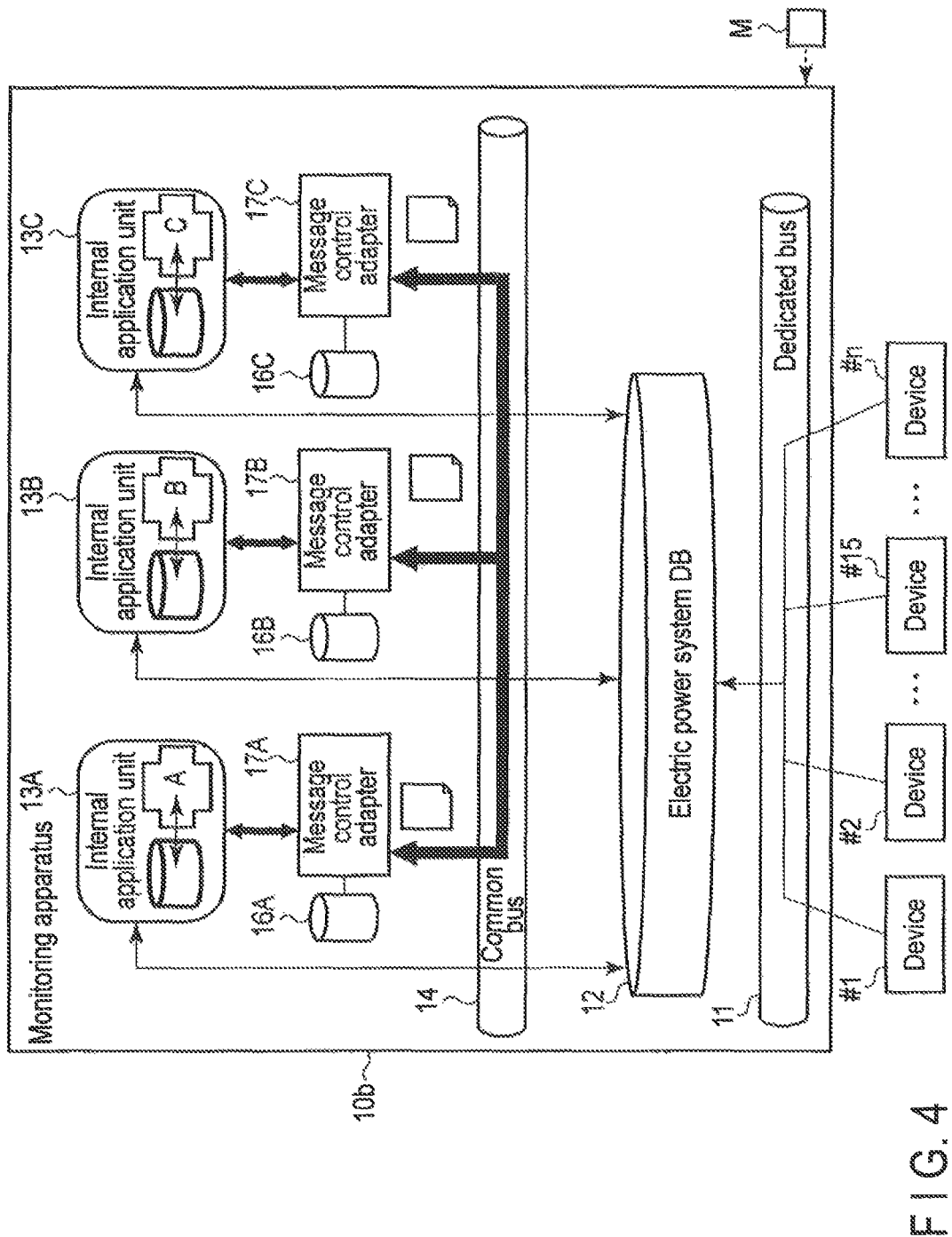
FIG. 4 is a schematic view showing a monitoring apparatus and its peripheral arrangement to which a message control program according to the first embodiment is applied.

FIG. 4 is a schematic view showing a monitoring apparatus to which a bus connection program according to the first embodiment is applied, and the peripheral arrangement of the monitoring apparatus. The same reference numerals as those shown in FIG. 3 denote the same parts, a detailed description thereof will not be repeated, and different parts will be mainly described below. Even in the following embodiments, a repetitive description will be omitted.

Although three internal application units 13A to 13C are shown in FIG. 4, each embodiment will exemplify message transmission in one internal application unit 13A, without exemplifying transmission/reception between the internal application units 13A to 13C.

The same part as the arrangement shown in FIG. 3 is an arrangement including a dedicated bus 11, an electric power system DB (data storage unit) 12, the internal application units 13A to 13C, and a common bus 14 in a monitoring apparatus 10.

The electric power system DB 12 stores data received from a plurality of devices #1 to #n.

The internal application units 13A to 13C transmit/receive, e.g., messages containing the data in the electric power system DB 12.

The common bus 14 is a bus capable of transmitting messages between the common bus 14 and internal application units 13A to 13C.

That is, the first embodiment further includes storage units 16A to 16C and message control adapters 17A to 17C, instead of bus connection adapters 15A to 15C, unlike the arrangement shown in FIG. 3.

The storage units 16A to 16C store files describing message types indicating the types of messages, service names for identifying the internal application units 13A to 13C, and communication method identification information for identifying communication methods of the messages, by associating these pieces of information with each other.

Figure 5:
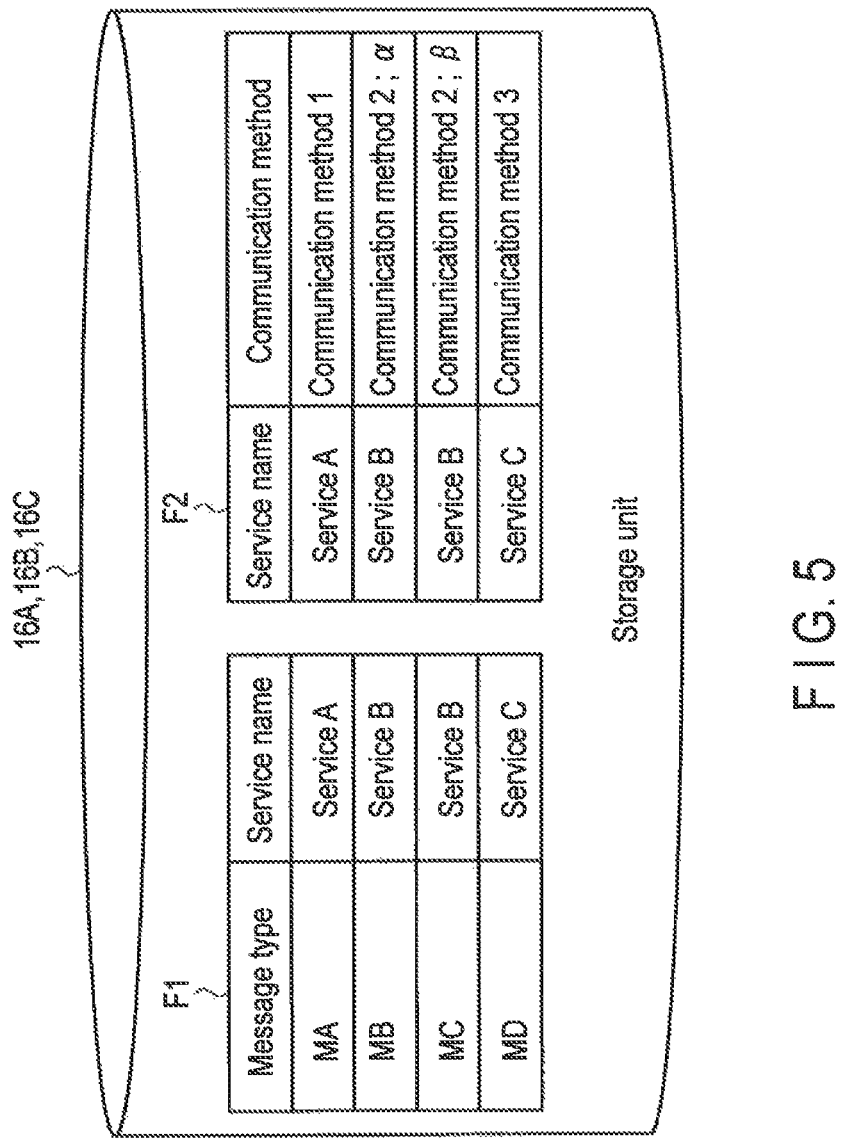
FIG. 5 is a schematic view for explaining a storage unit in the first embodiment.

More specifically, as shown in FIG. 5, the storage units 16A to 16C store a first file F1 describing message types and service names by associating them with each other, and a second file F2 describing the service names and communication method identification information by associating them with each other.

Note that the communication method identification information can contain communication method names "communication method 1", . . . , "communication method 3" for identifying communication methods, and unique identifiers "α" and "β" for identifying a connection, session, or queue in these communication methods.

The unique identifiers "α" and "β" may also be omitted from the communication method identification information. Note that the first and second files F1 and F2 may also be modified into one file (not shown) describing the message types, service names, and communication method identification information by associating them with each other. Note also that the first and second files F1 and F2 can describe data not only by a table form but also by a desired form such as an XML form.

The communication method is a means (method) for transmitting/receiving messages. For example, it is possible to appropriately use Socket or JMS (Java Messaging Service).

JMS is a sophisticated messaging communication method and has a higher communication load and lower communication speed than those of Socket.

Socket has a lower communication load and higher communication speed than those of JMS.

Accordingly, an optimum communication method is preselected by an administrator in accordance with the service contents, and communication method identification information indicating the optimum communication method is written in the storage units 16A to 16C.

On the other hand, each of the message control adapters (message control unit) 17A to 17C is a functional unit which is implemented when a processor (not shown) in the monitoring apparatus 10 executes a message control program in a memory (not shown).

In other words, the message control adapters 17A to 17C can be implemented by combining hardware resources and software. As this software, as shown in FIG. 4, a message control program which is preinstalled in a computer of the monitoring apparatus 10 from a network or non-transitory computer-readable storage medium M and causes the computer to implement the functions of the message control adapters 17A to 17C is used.

It is, however, also possible to implement each of the message control adapters 17A to 17C not only as the combination of hardware resources and software, but also as a message connecting device having a hardware configuration.

The message control adapters 17A to 17C individually control communication methods of messages transmitted from the internal application units 13A to 13C, and have, e.g., following functions (f17-1) to (f17-8):

(f17-1) A receiving function of receiving a message containing the message type and service name from the internal application unit 13A, 13B, or 13C.

(f17-2) A specifying function of specifying communication method identification information from the files F1 and F2, based on the message type and service name in the received message.

(f17-3) A sending function of changing the communication method of the received message based on the specified communication method identification information, and sending the message to the common bus 14.

The sending function (f17-3) may include following functions (f17-3-1) to (f17-3-3).

(f17-3-1) A first changing function of changing a communication method based on communication method names "communication method 1", . . . , "communication method 3".

(f17-3-2) A second changing function of changing a connection, session, or queue in the communication method based on unique identifiers "α" and "β".

(f17-3-3) A function of sending the message to the common bus 14 after the changes by the first changing function (f17-3-1) and second changing function (f17-3-2).

Next, the operation of the monitoring apparatus including the message control adapters 17A to 17C configured as described above will be explained with reference to FIGS. 6 and 7. Note that the following explanation will be given by taking, as an example, a case in which the internal application unit 13A sends a message to the common bus via the message control adapter 17A. However, the present invention is not limited to this, and the internal application unit 13B or 13C may send a message to the common bus 14 via the message control adapter 17B or 17C.

First, in the monitoring apparatus 10, a processor (not shown) activates the message control adapter 17A by executing the message control program.

As an initialization process, the message control adapter 17A reads the files F1 and F2 from the storage unit 16A.

Also, as another initialization process, the message control adapter 17A connects to the common bus 14 and internal application unit 13A.

Subsequently, the message control adapter 17A receives a message containing the message type and service name from the internal application unit 13A.

Based on the message type and service name in the received message, the message control adapter 17A specifies communication method identification information from the files F1 and F2.

The message control adapter 17A changes the communication method of the received message based on the specified communication method identification information, and sends the message to the communication bus 14.

In this case, as shown in, e.g., FIG. 6, the communication method of a message m2 containing a message type "MD" and service name "service D" is changed from the communication method of the internal application unit 13A to a communication method "communication method 4" associated with the message type "MD" and service name "service D". The communication method of a message m1 containing a message type "MB" and service name "service B" is changed to "communication method 2", and the unique identifier of a connection, session, or queue is changed to "α".

When the communication speed of "communication method 4" is higher than that of "communication method 2", the message m2 of "communication method 4" can pass the message m1 of "communication method 2".

As described above, priority processing of a message can be controlled in accordance with the service (processing contents) by selecting a communication method corresponding to the service name contained in the message.

Also, a faster communication method is defined in the file F2 for a message of a preferential service. This makes it possible to communicate the message faster than messages of other services.

As shown in, e.g., FIG. 7, for a service name using the CIS standards, the HSDA service requires high-speed communication. Therefore, "communication method 4" as a high-speed communication method is defined in the file F2.

In this embodiment as described above, the message control adapter 17A specifies communication method identification information from the files F1 and F2 based on the message type and service name in a message received from the internal application unit 13A, changes the communication method of the received message based on the specified communication method identification information, and sends the message to the common bus. This arrangement can implement priority control of messages flowing through the common bus.

In other words, the arrangement in which a communication method can be selected in accordance with the processing contents (service) in the message control adapters 17A to 17C can implement priority control of messages flowing through the common bus.

More specifically, the priority (transmission performance) of a message changes in accordance with the processing contents (service). For example, an alert message has a high priority and must be transmitted/received at high speed. In this embodiment, a communication method is selected for each service, instead of using the same communication method for all services. This arrangement makes it possible to control the priority of a message.

<Second Embodiment>

Next, a message control adapter and its peripheral arrangement based on a message control program according to the second embodiment will be explained with reference to FIG. 4 described above.

The second embodiment is a modification of the first embodiment, and is a form in which if a delay (a network delay or a delay caused by process concentration) occurs in a communicating means, message control is executed so as to use another communicating means even for the same service. Three methods [1] to [3] below are possible as a priority processing method by message control:

[1] A method (to be also referred to as a first method hereinafter) of changing a connection, session, or queue by using the same communication method.

[2] A method (to be also referred to as a second method herein after) using different communication methods.

[3] A method (to be also referred to as a third method hereinafter) using [1] and [2] described above by combining them.

In the following explanation, an example using the first method will be described in this embodiment, and examples using the second and third embodiments will be described in third and fourth embodiments.

In this embodiment, more specifically, as shown in FIG. 8, storage units 16A to 16C store a third file F3 instead of a second file F2.

The third file F3 describes service names and communication method identification information by associating them with each other. In this example, the service names in the third file F3 are described in the left column.

The communication method identification information in the third file F3 contains a first communication method name to be used when there is no message transmission delay, and a second communication method name to be used when there is a message transmission delay.

In this example, the first communication method names are described in the middle column of the file F3. The file F3 describes, in addition to the first communication method name, unique identifiers "α" and "β" for identifying a connection, session, or queue in a communication method having the first communication method name.

In this example, the second communication method names are described in the right column of the file F3. Similarly, the file F3 describes, in addition to the second communication method name, unique identifiers "β" and "γ" for identifying a connection, session, or queue in a communication method having the second communication method name.

Accordingly, a specifying function (f17-2) of message control adapters 17A to 17C has a function (f17-2-1) of specifying the first or second communication method name from a file F1 and the file F3 based on the message type, the service name, and the presence/absence of a delay. The specifying function (f17-2) has the function (f17-2-1) in the third and fourth embodiments (to be described later) as well.

The presence/absence of a delay is known when the message control adapters 17A to 17C periodically perform determination by using Heart beat or the like, and hold a flag indicating the determination result. This similarly applies to each of the following embodiments.

The operation of a monitoring apparatus including the message control adapters 17A to 17C configured as described above will now be explained. Note that the following explanation will be given by taking, as an example, a case in which an internal application unit 13A sends a message to a common bus via the message control adapter 17A.

However, the present invention is not limited to this, and an internal application unit 13B or 13C may also send a message to a common bus 14 via the message control adapter 17B or 17C.

First, in a monitoring apparatus 10, a processor (not shown) activates the message control adapter 17A by executing the message control program.

As an initialization process, the message control adapter 17A reads the files F1 and F3 from the storage unit 16A.

Also, as another initialization process, the message control adapter 17A connects to the common bus 14 and internal application unit 13A.

Subsequently, the message control adapter 17A receives a message containing the message type and service name from the internal application unit 13A.

Based on the message type and service name in the received message, the message control adapter 17A specifies communication method identification information from the files F1 and F3.

In this step, the message control adapter 17A specifies the first or second communication method name from the files F1 and F3, based on the presence/absence of a delay in addition to the message type and service name.

After that, the message control adapter 17A changes the communication method of the received message based on the specified communication method identification information, and sends the message to the communication bus 14.

In this case, as shown in, e.g., FIG. 9, when there is no delay (in a normal case), the communication method of message m1 is changed from the communication method of the internal application unit 13A to a communication method "communication method 2; α" associated with a message type "MB", a service name "service B", and a communication method to be used when there is no delay.

On the other hand, when there is a delay, the communication method of message m2 is changed from the communication method of the internal application unit 13A to a communication method "communication method 2; β" associated with the message type "MB", the service name "service B", and a communication method to be used when there is a delay. The unique identifier β represents a connection, session, or queue for passing only.

When the communication speed of "communication method 2; β" is higher than that of "communication method 2; α", message m2 of "communication method 2; R" can pass message m1 of "communication method 2; α".

In this embodiment as described above, the first or second communication method name is specified from the files F1 and F3 based on the message type, the service name, and the presence/absence of a delay. This arrangement can implement priority control of a message when a delay occurs in a communicating means, in addition to the effect of the first embodiment.

Also, in the first method described in this embodiment, a connection, session, or queue is changed by using the same communication method in accordance with the presence/absence of a delay. If a delay occurs, preferential processing of a message is performed by using the unique identifier such as the connection, session, or queue. For example, a queue prepared for passing only can be used for a message having a high priority.

More specifically, a message having a high urgency exists even for the same service. In this case, this message can pass other messages when a communicating means for passing only is prepared. Also, if a delay occurs in the communicating means, the message can pass other messages in accordance with rules.

<Third Embodiment>

Next, a message control adapter and its peripheral arrangement based on a message control program according to the third embodiment will be explained with reference to FIG. 4 described above.

The third embodiment is a modification of the second embodiment, and is a form in which if a delay occurs in a communicating means, message control is executed by the second method using a different communicating method.

In this embodiment, more specifically, as shown in FIG. 10, storage units 16A to 16C store a fourth file F4 instead of a third file F3.

The fourth file F4 describes service names and communication method identification information by associating them with each other. In this example, the service names in the fourth file F4 are described in the left column.

The communication method identification information in the fourth file F4 contains a first communication method name to be used when there is no message transmission delay, and a second communication method name to be used when there is a message transmission delay.

In this example, the first communication method names are described in the middle column of the file F4.

In this example, the second communication method names are described in the right column of the file F4.

As described previously, a specifying function (f17-2) of message control adapters 17A to 17C has a function (f17-2-1) for specifying the first or second communication method name from a file F1 and the file F4 based on the message type, the service name, and the presence/absence of a delay.

The operation of a monitoring apparatus including the message control adapters 17A to 17C configured as described above will now be explained. Note that the following explanation will be given by taking, as an example, a case in which an internal application unit 13A sends a message to a common bus via the message control adapter 17A. However, the present invention is not limited to this, and an internal application unit 13B or 13C may also send a message to a common bus 14 via the message control adapter 17B or 17C.

First, in a monitoring apparatus 10, a processor (not shown) activates the message control adapter 17A by executing the message control program.

As an initialization process, the message control adapter 17A reads the files F1 and F4 from the storage unit 16A.

Also, as another initialization process, the message control adapter 17A connects to the common bus 14 and internal application unit 13A.

Subsequently, the message control adapter 17A receives a message containing the message type and service name from the internal application unit 13A.

Based on the message type and service name in the received message, the message control adapter 17A specifies communication method identification information from the files F1 and F4.

In this step, the message control adapter 17A specifies the first or second communication method name from the files F1 and F4, based on the presence/absence of a delay in addition to the message type and service name.

After that, the message control adapter 17A changes the communication method of the received message based on the specified communication method identification information, and sends the message to the communication bus 14.

In this case, as shown in, e.g., FIG. 11, if there is a delay, the communication method of message m2 is changed from the communication method of the internal application unit 13A to a communication method "communication method 1" associated with a message type "MB", a service name "service B", and a communication method to be used when there is a delay. When the communication speed of "communication method 1" is higher than that of "communication method 2", message m2 of "communication method 1" can pass message m1 of "communication method 2".

For example, it is possible to use JMS (Java Messaging Service) as "communication method 2" in a normal state, and use Socket (preferential processing: for passing only) as "communication method 1" when a delay occurs.

JMS is a sophisticated messaging communication method and hence has a large communication load. Therefore, Socket communication is prepared for passing only, and used if it is determined that passing is necessary.

In this embodiment as described above, the first or second communication method name is specified from the files F1 and F4 based on the message type, the service name, and the presence/absence of a delay. This arrangement can achieve the same effect as that of the second embodiment.

Also, in the second method described in this embodiment, a different communication method is used in accordance with the presence/absence of a delay. If a delay occurs, therefore, preferential processing of a message is performed by changing the communication method. For example, a high-speed communication method can be used for a message having a high priority.

<Fourth Embodiment>

Next, a message control adapter and its peripheral arrangement based on a message control program according to the fourth embodiment will be explained with reference to FIG. 4 described above.

The fourth embodiment is a combination example of the second and third embodiments, and is a form in which if a delay occurs in a communicating means, message control is executed by the third method combining first and second methods.

In this embodiment, more specifically, as shown in FIG. 12, storage units 16A to 16C store a fifth file F5 instead of a third or fourth file F3 or F4.

The fifth file F5 describes service names and communication method identification information by associating them with each other. In this example, the service names in the fifth file F5 are described in the left column.

The communication method identification information in the fifth file F5 contains a first communication method name to be used when there is no message transmission delay, and a second communication method name to be used when there is a message transmission delay.

In this example, the first communication method names are described in the middle column of the file F5. The file F5 sometimes further describes, in addition to the first communication method name, unique identifiers "α" and "β" for identifying a connection, session, or queue in a communication method having the first communication method name.

In this example, the second communication method names are described in the right column of the file F5. Similarly, the file F5 sometimes further describes, in addition to the second communication method name, unique identifiers "β" and "γ" for identifying a connection, session, or queue in a communication method having the second communication method name.

A specifying function (f17-2) of message control adapters 17A to 17C has a function (f17-2-1) for specifying the first or second communication method name from a file F1 and the file F5 based on the message type, the service name, and the presence/absence of a delay.

Figure 13:
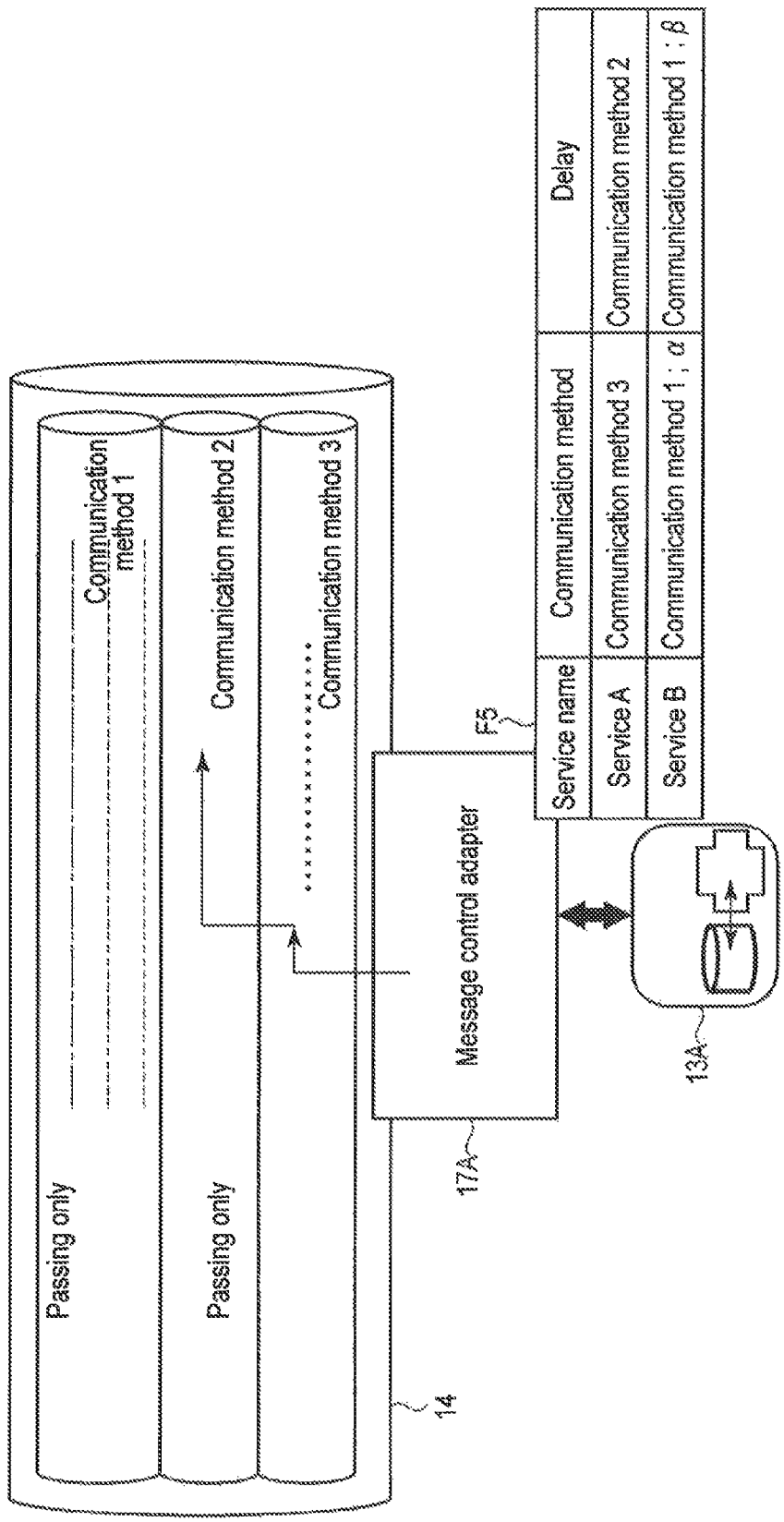
FIG. 13 is a schematic view for explaining an operation in the fourth embodiment.

In the above arrangement, as shown in FIG. 13, in accordance with the settings of the file F5, "communication method 3" can be changed to high-speed "communication method 2" if a delay occurs for a message of "service A", and "communication method 1; α" can be changed to high-speed "communication method 1; β" if a delay occurs for a message of "service B".

That is, this arrangement using the first or second method in accordance with a message can achieve the effects of the second and third embodiments in accordance with a message.

<Fifth Embodiment>

Next, a message control adapter and its peripheral arrangement based on a message control program according to the fifth embodiment will be explained with reference to FIG. 4 described above.

The fifth embodiment is a modification of the first embodiment, and is a form in which if an error occurs in communication, message control is executed by a method using a different communication method.

In this embodiment, more specifically, as shown in FIG. 14, storage units 16A to 16C store a sixth file F6 instead of a second file F2.

The sixth file F6 describes service names and communication method identification information by associating them with each other. In this example, the service names in the sixth file F6 are described in the left column.

The communication method identification information in the sixth file F6 contains a first communication method name to be used when there is neither a delay nor an error in message transmission, and a third communication method name to be used when there is a message transmission error.

In this example, the first communication method names are described in the middle column of the file F6.

In this example, the third communication method names are described in the right column of the file F6.

Accordingly, a specifying function (f17-2) of message control adapters 17A to 17C has, instead of the above-described function (f17-2-1), a function (f17-2-2) for specifying the first or third communication method name from a file F1 and the file F6 based on the message type, the service name, and the presence/absence of an error. The specifying function (f17-2) has the function (f17-2-2) in the sixth embodiment (to be described later) as well.

The presence/absence of an error is known when the message control adapters 17A to 17C periodically perform determination by using Heart beat or the like, and hold a flag indicating the determination result. This similarly applies to each of the following embodiments.

The operation of a monitoring apparatus including the message control adapters 17A to 17C configured as described above will now be explained. Note that the following explanation will be described by taking, as an example, a case in which an internal application unit 13A sends a message to a common bus via the message control adapter 17A. However, the present invention is not limited to this, and an internal application unit 13B or 13C may also send a message to a common bus 14 via the message control adapter 17B or 17C.

First, in a monitoring apparatus 10, a processor (not shown) activates the message control adapter 17A by executing the message control program.

As an initialization process, the message control adapter 17A reads the files F1 and F6 from the storage unit 16A.

Also, as another initialization process, the message control adapter 17A connects to the common bus 14 and internal application unit 13A.

Subsequently, the message control adapter 17A receives a message containing the message type and service name from the internal application unit 13A.

Based on the message type and service name in the received message, the message control adapter 17A specifies communication method identification information from the files F1 and F6.

In this step, the message control adapter 17A specifies the first or third communication method name from the files F1 and F6, based on the presence/absence of an error in addition to the message type and service name.

After that, the message control adapter 17A changes the communication method of the received message based on the specified communication method identification information, and sends the message to the communication bus 14.

Figure 15:
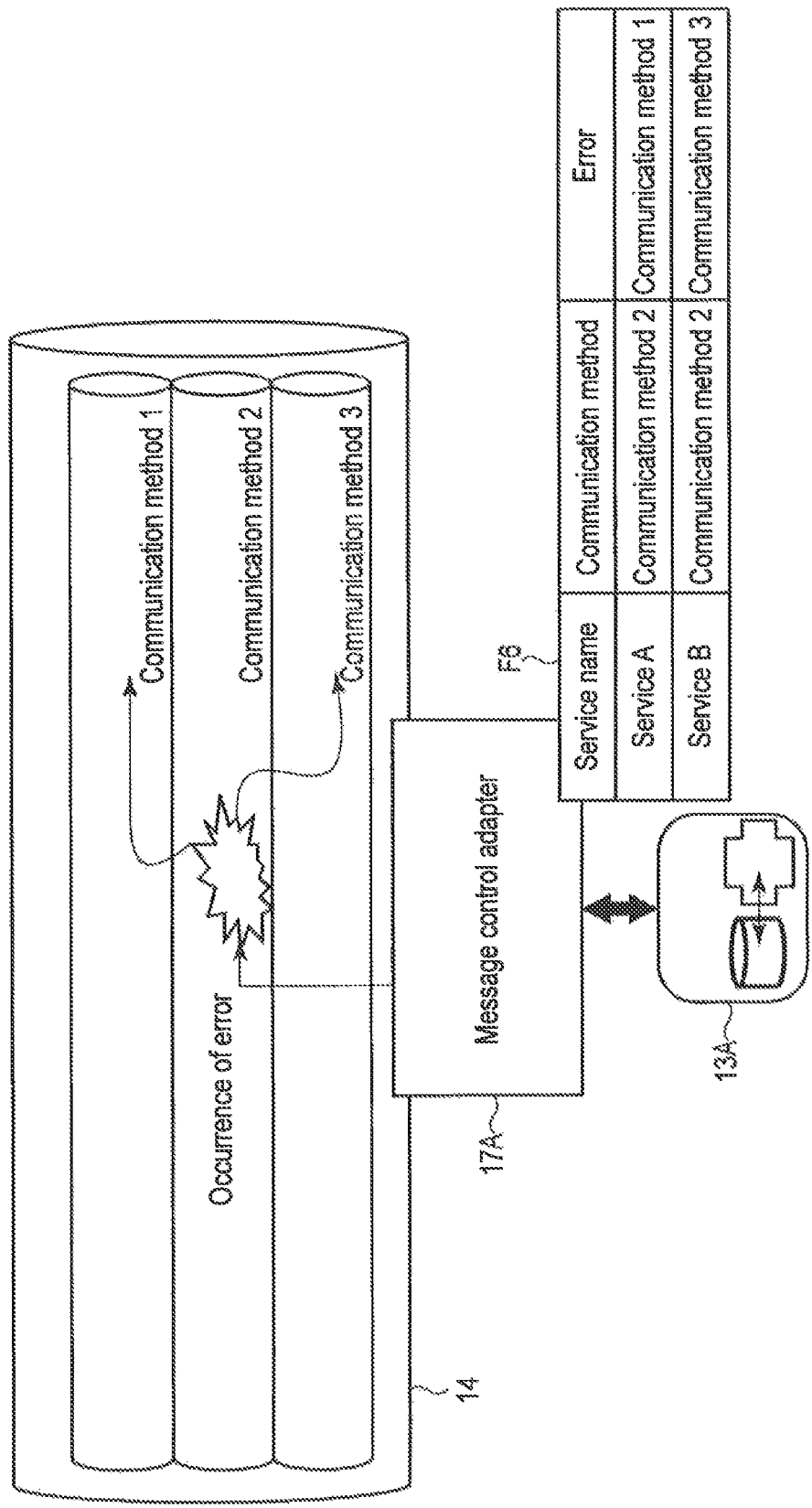
FIG. 15 is a schematic view for explaining an operation in the fifth embodiment.

In this case, as shown in, e.g., FIG. 15, when there is no error (in a normal case), the communication method of the message is changed from the communication method of the internal application unit 13A to a communication method "communication method 2" associated with a message type "MB", a service name "service B", and a communication method to be used when there is no error.

On the other hand, when there is an error, the communication method of the message is changed from the communication method of the internal application unit 13A to a communication method "communication method 3" associated with the message type "MB", the service name "service B", and a communication method to be used when there is an error.

When the communication speed of "communication method 3" is higher than that of "communication method 2", a message of "communication method 3" can pass a message of "communication method 2".

In this embodiment as described above, the first or third communication method name is specified from the files F1 and F6 based on the message type, the service name, and the presence/absence of an error. This arrangement can implement priority control of a message when an error occurs in a communicating means, in addition to the effect of the first embodiment.

Also, if an error occurs in a communicating means of the message control adapters 17A to 17C, processing can be continued by another communicating means in accordance with rules. For example, if an error occurs in a communicating means, processing can be continued without any interruption by using another communicating means in accordance with preset rules.

<Sixth Embodiment>

Next, a message control adapter and its peripheral arrangement based on a message control program according to the sixth embodiment will be explained with reference to FIG. 4 described above.

The sixth embodiment is a combination example of the fourth and fifth embodiments, and is a form in which message control is executed by combining the third method to be used when a delay occurs in a communicating means, and a method using a different communication method when an error occurs in a communicating means.

In this embodiment, more specifically, as shown in FIG. 16, storage units 16A to 16C store a seventh file F7 instead of a fifth or sixth file F5 or F6.

The seventh file F7 describes service names and communication method identification information by associating them with each other. In this example, the service names in the seventh file F7 are described in the left column.

The communication method identification information in the seventh file F7 contains a first communication method name to be used when there is neither a delay nor an error in message transmission, a second communication method name to be used when there is a message transmission delay, and a third communication method name to be used when there is a message transmission error.

In this example, the first communication method names are described in the third column from the right of the file F7. The file F7 sometimes further describes, in addition to the first communication method name, unique identifiers "α" and "β" for identifying a connection, session, or queue in a communication method having the first communication method name.

In this example, the second communication method names are described in the second column from the right of the file F7. Similarly, the file F7 sometimes further describes, in addition to the second communication method name, a unique identifier "γ" for identifying a connection, session, or queue in a communication method having the second communication method name. To prepare for a case in which a delay further occurs in a communication method having the changed communication method name, a plurality of candidates such as a second candidate, a third candidate, . . . can be defined as the second communication method name.

In this example, the third communication method names are described in the first column from the right of file F7. To prepare for a case in which an error further occurs in a communication method having the changed communication method name, a plurality of candidates such as a second candidate, a third candidate, . . . can be defined as the third communication method name.

As described previously, a specifying function (f17-2) of message control adapters 17A to 17C has a function (f17-2-1) for specifying the first or second communication method name from a file F1 and the file F7 based on the message type, the service name, and the presence/absence of a delay, and a function (f17-2-2) of specifying the first or third communication method name from the files F1 and F7 based on the message type, the service name, and the presence/absence of an error.

In the above arrangement as shown in FIG. 17, in accordance with the settings of the file F7, "communication method 2" can be changed to high-speed "communication method 1" if a delay occurs for a message of "service A", and "communication method 4" can be changed to high-speed "communication method 1" if a delay occurs for a message of "service B".

Also, in accordance with the settings of the file F7, "communication method 2" can be changed to "communication method 3" if an error occurs for a message of "service A", and "communication method 4" can be changed to "communication method 3" if an error occurs for a message of "service B".

That is, the second communication method name is specified in accordance with a message if a delay occurs, and the third communication method name is specified in accordance with a message if a delay occurs. This arrangement can achieve the effects of the fourth and fifth embodiments.

<Seventh Embodiment>

Next, a message control adapter and its peripheral arrangement based on a message control program according to the seventh embodiment will be explained with reference to FIG. 4 described above.

This embodiment is a practical example of the first to sixth embodiments, and realizes practical processing on the transmission and reception sides when changing a communication method.

Figure 18:
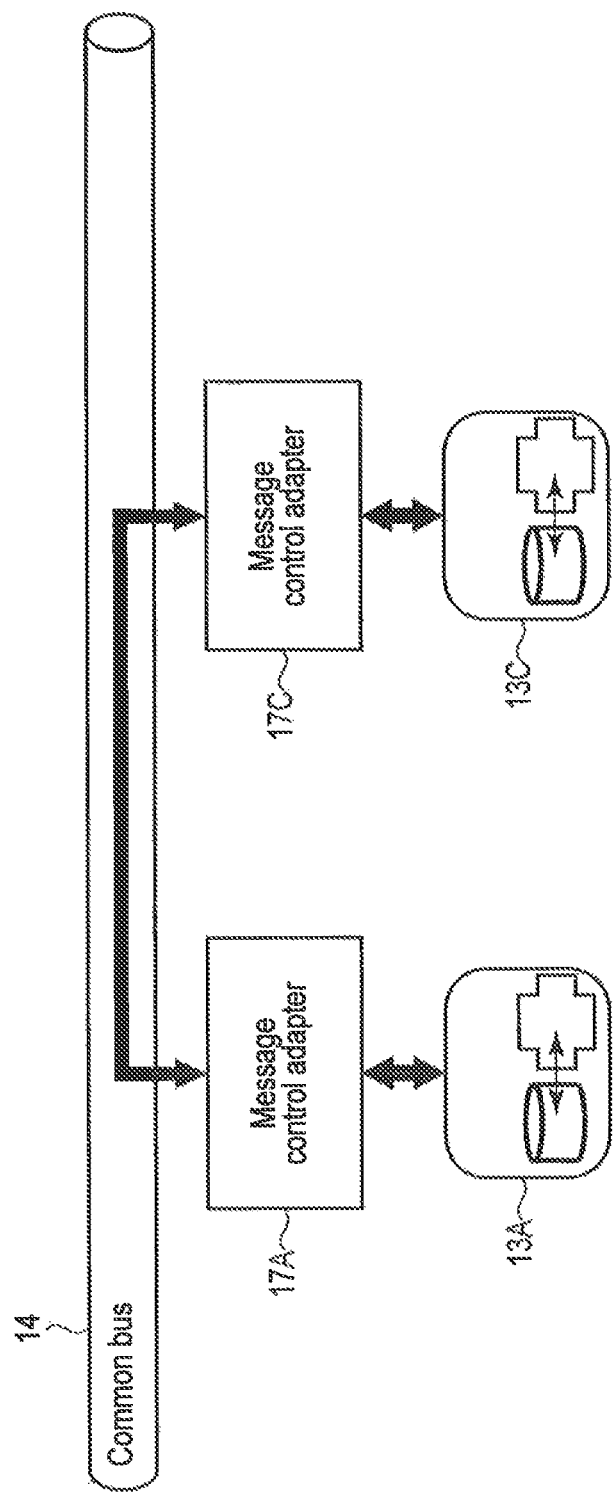
FIG. 18 is a schematic view for explaining message transmission/reception in the seventh embodiment.

For example, as shown in FIG. 18, when a message control adapter 17A or 17C on the transmission side has changed a communication method, the message control adapter 17C or 17A on the reception side must send a message received by the changed communication method to correct service processing.

Accordingly, a sending function (f17 -3) of the message control adapters 17A to 17C includes functions for changing a communication method, giving a message m a change flag indicating the change, a communication method name before the change, and a service name associated with the communication method name before the change, and sending the message m to a common bus 14.

The message control adapter 17C further includes a received message sending function (f17-4) for receiving the message m sent from the message control adapter 17A or 17B to the common bus 14, and sending the message m to an internal application unit 13C based on the change flag, communication method name, and service name given to the message m.

Likewise, the message control adapters 17A and 17B further include the received message sending function (f17-4).

Figure 19:
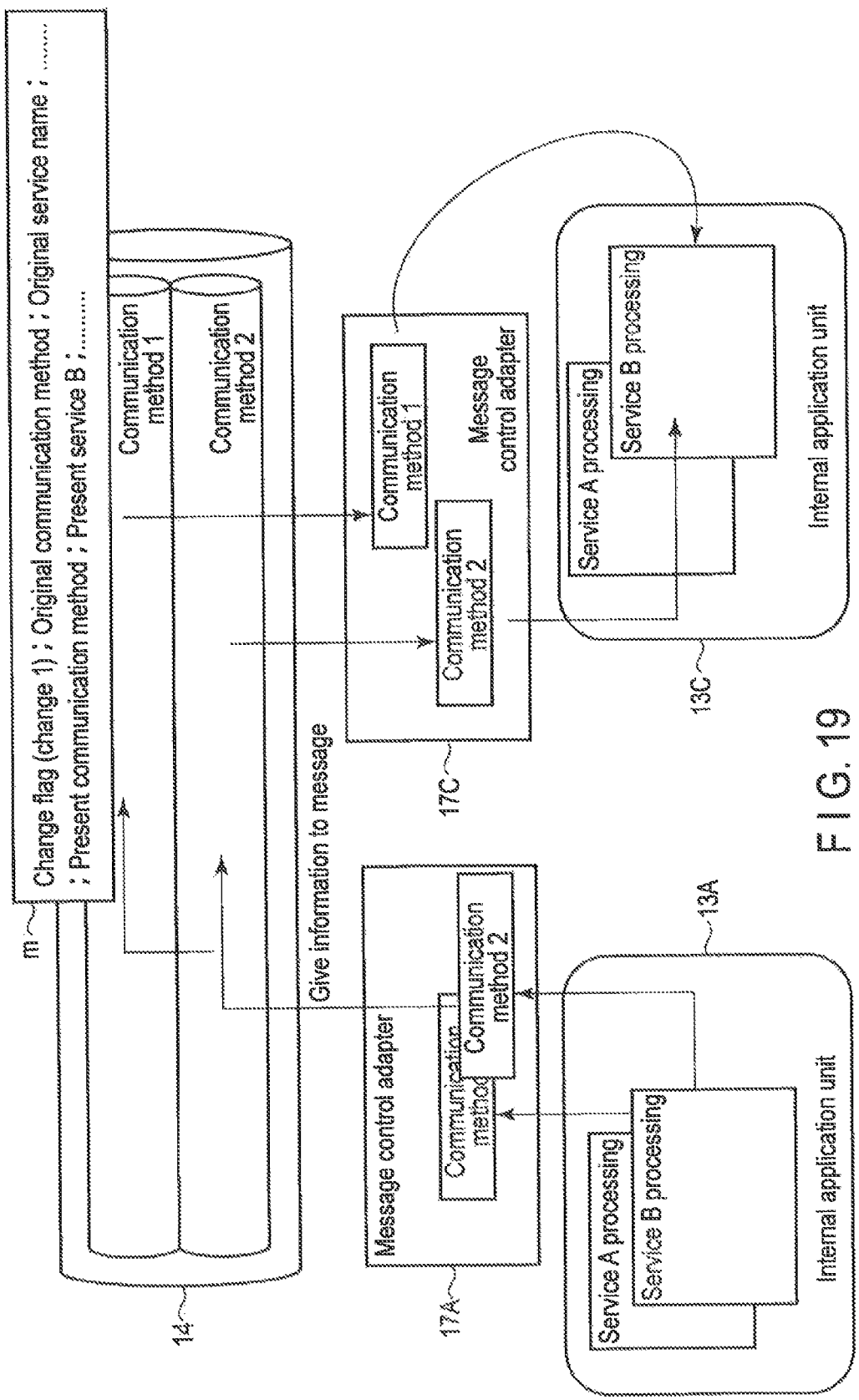
FIG. 19 is a schematic view for explaining an operation in the seventh embodiment.

The operation of a monitoring apparatus including the message control adapters 17A to 17C configured as described above will now be explained with reference to FIG. 19. Note that the following explanation will be described by taking, as an example, a case in which an internal application unit 13A sends a message to the common bus via the message control adapter 17A. However, the present invention is not limited to this, and an internal application unit 13B or 13C may also send a message to the common bus 14 via the message control adapter 17B or 17C.

First, in a monitoring apparatus 10, a processor (not shown) activates the message control adapter 17A by starting the execution of the message control program.

As an initialization process, the message control adapter 17A reads files F1 and F2 and the like from a storage unit 16A.

Also, as another initialization process, the message control adapter 17A connects to the common bus 14 and internal application unit 13A.

Subsequently, the message control adapter 17A receives a message containing the message type and service name from the internal application unit 13A.

Based on the message type and service name in the received message, the message control adapter 17A specifies communication method identification information from the files F1 and F2 and the like.

The message control adapter 17A changes the communication method of the received message m based on the specified communication method identification information, gives the message m a change flag indicating the change, a communication method name (original communication method) before the change, and a service name (original service name) associated with the communication method name before the change, and sends the message m to the communication bus 14. Note that the message m is further given a communication method name (present communication method) after the change, and a service name (present service name) associated with the communication method name after the change, in addition to the change flag, original communication method, and original service name.

On the other hand, the message control adapter 17C on the reception side receives the message m sent from the message control adapter 17A to the common bus 14, and sends the message to the internal application unit 13C based on the change flag, communication method name, and service name given to the message m. The internal application unit 13C corresponds to the original communication method name and original service name.

Accordingly, even when using a different communicating means such as communication method 1 for passing only, for example, a message can be transferred to processing of service B corresponding to the original communication method and original service name.

In this embodiment as described above, the message control adapter 17A on the transmission side gives a message the change flag, original communication method, and original service name. Therefore, the message control adapter 17C on the reception side can send the message to the internal application unit 13C which executes processing of a service corresponding to the original communication method and original service name.

According to at least one of the embodiments explained above, the message control adapters 17A to 17C can select a communication method in accordance with the processing contents (service). This arrangement can implement priority control of messages flowing through the common bus.

The method described in each embodiment can also be stored in a storage medium such as a magnetic disk (Floppy™ disk, hard disk, or the like), an optical disk (CD-ROM, DVD, or the like), a magneto-optical disk (MO), or a semiconductor memory as a program which can be executed by a computer and distributed.

As the storage medium, any configuration which is a computer-readable storage medium in which a program can be stored may be used regardless of a storage format.

An OS (operating system) which operates on a computer on the basis of an instruction of a program installed from the storage medium in the computer, database management software, and MW (middleware) such as network software may execute a part of the processes to realize the embodiment.

Furthermore, the storage medium according to each embodiment includes not only a medium independent of a computer but also a storage medium in which a program transmitted through a LAN, the Internet, or the like is downloaded and stored or temporarily stored.

The number of storage media is not limited to one. A case in which the process in each embodiment is executed from a plurality of media is included in the storage medium according to the present invention. Any medium configuration may be used.

A computer according to each embodiment is to execute the processes in each embodiment on the basis of the program stored in a storage medium. The computer may have any configuration such as one apparatus constituted by a personal computer or a system in which a plurality of apparatuses are connected by a network.

A computer in each embodiment includes not only a personal computer but also an arithmetic processing apparatus, a microcomputer, or the like included in an information processing apparatus. The computer is a generic name of an apparatus and a device which can realize the functions of the present invention by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A message control program which is stored in a non-transitory computer-readable storage medium, and which is used for a monitoring apparatus comprising a data storage unit configured to store data received from a plurality of devices, a plurality of internal application units configured to transmit/receive a message containing the data in the data storage unit, and a common bus configured to transmit the message between the plurality of internal application units, the monitoring apparatus executing the message control program, the monitoring apparatus further comprising a storage unit configured to store a file describing a message type indicating a type of the message, a service name for identifying the internal application unit, and communication method identification information for identifying a communication method of the message, by associating the pieces of information with each other, the message control program causes the monitoring apparatus to further function as a plurality of message control unit configured to individually control a communication method of a message transmitted from each internal application unit, and each message control unit including:

a reception unit configured to receive a message containing the message type and the service name from the internal application unit;

a specifying unit configured to specify communication method identification information from the file based on the message type and the service name in the received message; and a sending unit configured to change the communication method of the received message based on the specified communication method identification information, and to send the message to the common bus.

2. The message control program according to claim 1, wherein the communication method identification information contains a communication method name for identifying the communication method, and a unique identifier for identifying one of a connection, a session, and a queue in the communication method, and the sending unit includes:

a first changing unit configured to change the communication method based on the communication method name;

a second changing unit configured to change one of the connection, the session, and the queue in the communication method based on the unique identifier; and a unit configured to send the message to the common bus after the changes by the first changing unit and the second changing unit.

3. The message control program according to claim 2, wherein the communication method identification information contains a first communication method name to be used when there is no delay in transmission of the message, and a second communication method name to be used when there is a delay in transmission of the message, and the specifying unit specifies one of the first communication method name and the second communication method name from the file based on the message type, the service name, and the presence/absence of a delay.

4. The message control program according to claim 3, wherein the communication method identification information contains a first communication method name to be used when there is neither a delay nor an error in transmission of the message, and a third communication method name to be used when there is an error in transmission of the message, and the specifying unit specifies one of the first communication method name and the third communication method name from the file based on the message type, the service name, and the presence/absence of an error.

5. The message control program according to claim 4, wherein the sending unit changes the communication method, gives the message a change flag indicating the change, a communication method name before the change, and a service name associated with the communication method name before the change, and sends the message to the common bus, and each message control unit further includes a received message sending unit configured to receive a message sent from another message control unit to the common bus, and to send the message to the internal application unit based on the change flag, the communication method name, and the service name given to the message.

6. The message control program according to claim 1, wherein the communication method identification information contains a first communication method name to be used when there is no delay in transmission of the message, and a second communication method name to be used when there is a delay in transmission of the message, and the specifying unit specifies one of the first communication method name and the second communication method name from the file based on the message type, the service name, and the presence/absence of a delay.

7. The message control program according to claim 6, wherein the communication method identification information contains a first communication method name to be used when there is neither a delay nor an error in transmission of the message, and a third communication method name to be used when there is an error in transmission of the message, and the specifying unit specifies one of the first communication method name and the third communication method name from the file based on the message type, the service name, and the presence/absence of an error.

8. The message control program according to claim 7, wherein the sending unit changes the communication method, gives the message a change flag indicating the change, a communication method name before the change, and a service name associated with the communication method name before the change, and sends the message to the common bus, and each message control unit further includes a received message sending unit configured to receive a message sent from another message control unit to the common bus, and to send the message to the internal application unit based on the change flag, the communication method name, and the service name given to the message.

9. The message control program according to claim 1, wherein the communication method identification information contains a first communication method name to be used when there is neither a delay nor an error in transmission of the message, and a third communication method name to be used when there is an error in transmission of the message, and the specifying unit specifies one of the first communication method name and the third communication method name from the file based on the message type, the service name, and the presence/absence of an error.

10. The message control program according to claim 9, wherein the sending unit changes the communication method, gives the message a change flag indicating the change, a communication method name before the change, and a service name associated with the communication method name before the change, and sends the message to the common bus, and each message control unit further includes a received message sending unit configured to receive a message sent from another message control unit to the common bus, and to send the message to the internal application unit based on the change flag, the communication method name, and the service name given to the message.

11. The message control program according to claim 2, wherein the communication method identification information contains a first communication method name to be used when there is neither a delay nor an error in transmission of the message, and a third communication method name to be used when there is an error in transmission of the message, and the specifying unit specifies one of the first communication method name and the third communication method name from the file based on the message type, the service name, and the presence/absence of an error.

12. The message control program according to claim 11, wherein the sending unit changes the communication method, gives the message a change flag indicating the change, a communication method name before the change, and a service name associated with the communication method name before the change, and sends the message to the common bus, and each message control unit further includes a received message sending unit configured to receive a message sent from another message control unit to the common bus, and to send the message to the internal application unit based on the change flag, the communication method name, and the service name given to the message.

13. The message control program according to claim 1, wherein the sending unit changes the communication method, gives the message a change flag indicating the change, a communication method name before the change, and a service name associated with the communication method name before the change, and sends the message to the common bus, and each message control unit further includes a received message sending unit configured to receive a message sent from another message control unit to the common bus, and to send the message to the internal application unit based on the change flag, the communication method name, and the service name given to the message.

14. The message control program according to claim 2, wherein the sending unit changes the communication method, gives the message a change flag indicating the change, a communication method name before the change, and a service name associated with the communication method name before the change, and sends the message to the common bus, and each message control unit further includes a received message sending unit configured to receive a message sent from another message control unit to the common bus, and to send the message to the internal application unit based on the change flag, the communication method name, and the service name given to the message.

15. The message control program according to claim 3, wherein the sending unit changes the communication method, gives the message a change flag indicating the change, a communication method name before the change, and a service name associated with the communication method name before the change, and sends the message to the common bus, and each message control unit further includes a received message sending unit configured to receive a message sent from another message control unit to the common bus, and to send the message to the internal application unit based on the change flag, the communication method name, and the service name given to the message.

* * * * *